July 11, 1933.  S. A. COGSDILL  1,917,925
PROCESSING TOOL
Filed Dec. 29, 1930
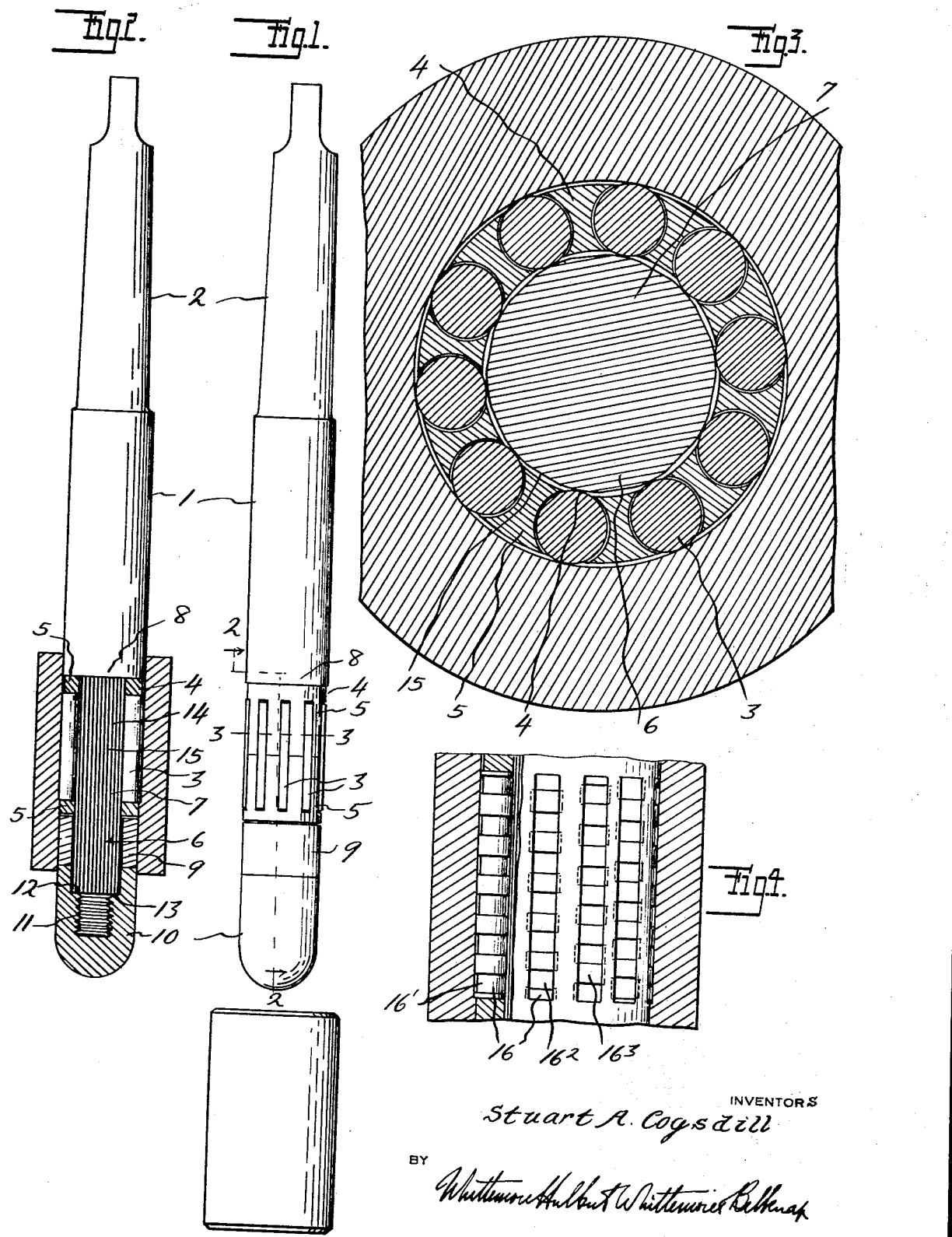
INVENTORS
Stuart A. Cogsdill
BY
ATTORNEYS Patented July 11, 1933

1,917,925

UNITED STATES PATENT OFFICE

STUART A. COGSDILL, OF DETROIT, MICHIGAN, ASSIGNOR TO COGSDILL MANUFACTURING COMPANY, OF DETROIT, MICHIGAN, A CORPORATION OF MICHIGAN

PROCESSING TOOL

Application filed December 29, 1930. Serial No. 505,376.

The invention relates to the method of and the tool for processing or sizing work, such as bearings, guides and the like. One of the objects of the invention is to so process the work that its desired dimension will be accurately secured. Another object is to so process the work that it will have a highly finished and hardened surface. Further objects are to provide a processing tool which will deliver a series of impacts to the work and to provide a processing tool which also rolls the work after each impact.

These and other objects of the invention will become apparent from the following description, taken in connection with the accompanying drawing, in which:

Figure 1 is an elevation of a processing tool showing an embodiment of my invention;

Figures 2 and 3 are cross sections respectively on the lines 2—2 and 3—3 of Figure 1;

Figure 4 is an elevation, partly in section, of a processing tool showing another embodiment of my invention.

The processing tool showing an embodiment of my invention as illustrated in the drawing, has the arbor 1 which is revoluble and has, as shown in the present instance, the tapered upper end portion 2 for fitting in the socket of a revoluble machine spindle, which is preferably rotated at relatively high speed. The arbor carries the processing members 3, which are in the nature of cylindrical rolls. These rolls are movable inwardly and outwardly relative to the arbor and are held in spaced relation and substantially parallel to the axis of the arbor by the retainer 4, which is formed of the two abutting sections 5 having registering sockets in which the rolls are located. The retainer provides for the movement of the rolls and is rotatably mounted upon the reduced lower end portion 6 of the arbor and more particularly upon the actuating portion 7 of this lower end portion. This retainer is held in place by the collar 8 above the retainer and preferably integral with the arbor and by the collar 9 below the retainer and sleeved upon the actuating portion of the arbor. The latter collar is held in place by means of the nut 10 which is threaded upon the threaded portion 11 at the lower end of the lower end portion 6 of the arbor and this threaded portion is of less diameter than the actuating portion 7 to form the annular shoulder 12 for engaging the internal annular shoulder 13 of the nut to position the nut so that it cannot tightly clamp against the annular collar 9 and bind the retainer against the collar 8.

The actuating portion 7 of the arbor is formed of the alternate high and low face portions 14 and 15 respectively. The high face portions are arcuate with the same radius of curvature and the low face portions are preferably flat, although it is apparent that the low face portions may have other contours. While the processing tool is being fed into the annular work, its arbor is, of course, being rotated so that the high and low face portions are successively engageable with the rolls. When the rolls are engaging the high face portions they are exerting an outward pressure upon the work and also rolling upon the high face portions and the work. When the rolls move over the high face portions the work then forces the rolls toward the low face portions. However, the rear portions of the low face portions force the rolls outwardly into contact with the work, at which time they again start to roll over the high face portions.

The lower end of the nut 10 is preferably rounded so that the nut forms a nose for guiding the processing tool into the work. The collar 9 is cylindrical and has a diameter substantially equal to the original internal diameter of the work to be processed, so that this collar accurately guides the processing tool relative to the work while the processing tool is being fed into the work. The collar 8 is also cylindrical and has a diameter substantially equal to the finished diameter of the work, so that this collar guides the processing tool relative to the work after the processing tool has been fed a sufficient distance into the work.

It will be understood that the parts of the tool are formed of suitable material or metal properly hardened to process the work.

In the operation of my processing tool, the rolls are forced outwardly into contact with the work and, since the arbor is rotated at relatively high speed, its actuating portion acts upon the rolls to deliver a series of impacts to the work. After each impact, the work is temporarily rolled by reason of the high face portions of the actuating portion of the arbor. During the continued rotation of the arbor, this cycle of delivering a series of impacts to the work and then rolling the work is continued, so that all points in the circumference of the work are acted upon and as a result the surface of the work acted upon will be formed to accurate size and will be highly finished and, furthermore, its hardness will be increased.

The general construction of the processing tool shown in Figure 4 is the same as that shown in Figures 1, 2 and 3, with the exception that the processing members 16, which are in the nature of rolls, have interrupted bearing surfaces with the interruptions of the successive rolls arranged in staggered relation or occupying different longitudinal zones of the processing tool. In detail, the processing members are formed with the annular recesses or grooves 16', 16², 16³, etc., with the width of these recesses or grooves preferably substantially equal to the widths of the surfaces of the processing members adapted to contact with the work. It will be noted that the recesses or grooves 16² occupy zones extending to the rear of the zones occupied by the recesses or grooves 16', while the same is true of the recesses or grooves 16³ in the next processing member relative to the recesses or grooves 16². With this arrangement it will be seen that as the processing tool is fed into the work longitudinally spaced portions of the processing members are forced into contact with the work and temporarily rolled thereagainst. It will also be seen that by reason of the location of the recesses or grooves in the processing members relative to each other the succeeding processing members will contact with and roll upon the portions of the work missed by the preceding processing members.

What I claim as my invention is:

1. A work processing tool comprising a revoluble arbor, rotatable processing rolls carried by said arbor, and means upon said arbor providing peripherally spaced faces for forcing said rolls outwardly relative to said arbor into contact with the work and then temporarily holding said rolls in contact with the work and then allowing said rolls to move inwardly relative to said arbor.

2. A work processing tool comprising a revoluble arbor having fixed alternate high and low face portions, processing rolls engageable with said high and low face portions, and a retainer loosely holding said rolls.

3. A work processing tool comprising a revoluble arbor having arcuate and flat face portions with the arcuate face portions of equal radius of curvature, processing rolls engageable with said arcuate and flat face portions, and a retainer for said rolls rotatable relative to said arbor.

4. A work processing tool, comprising a revoluble arbor, rotatable processing rolls carried by said arbor, said processing rolls having longitudinally spaced annular recesses or grooves with the recesses or grooves in one processing roll occupying a different longitudinal zone than the recesses or grooves of an adjacent processing roll, and means upon said arbor providing peripherally spaced faces for forcing said rolls outwardly relative to said arbor into contact with the work and then temporarily holding said rolls in contact with the work.

5. A work processing tool, comprising an arbor, a series of cylindrical processing rolls rotatably carried by said arbor, and means upon said arbor providing fixed peripherally spaced faces for forcing said rolls outwardly relative to said arbor and intermediate portions for receiving said rolls upon movement thereof inwardly relative to said arbor.

6. A work processing tool, comprising an arbor, a series of circumferentially spaced axially extending processing rolls rotatably carried by the arbor, means upon the arbor for simultaneously forcing said rolls outwardly relative to the arbor into contact with the work including circumferentially spaced cam faces on the periphery of the arbor corresponding in number and spacing to the processing rolls aforesaid, and means upon the arbor intermediate the cam faces providing for rolling the work by said processing rolls.

7. A work processing tool, comprising a revoluble arbor, a series of circumferentially spaced axially extending processing rolls mounted for rotation relative to the arbor, a series of circumferentially spaced cam faces on the periphery of the arbor corresponding in number to the number of processing rolls and operable upon relative rotation of the latter and arbor to simultaneously move said rolls outwardly into engagement with the work for delivering a series of impacts to the latter, and means on the arbor intermediate the cam faces for engaging the rolls subsequent to the operation of the aforesaid means to provide for rolling the work by said processing rolls.

In testimony whereof I affix my signature.

STUART A. COGSDILL.